(12) United States Patent
Morrison et al.

(10) Patent No.: US 9,703,741 B2
(45) Date of Patent: Jul. 11, 2017

(54) CONNECTOR WITH A TERMINATION MODULE

(71) Applicant: CommScope Technologies LLC, Hickory, NC (US)

(72) Inventors: Charles B. Morrison, Forest, VA (US); Nelson Christian Schmidt, Jr., Lexington, VA (US); Van E. Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 459 days.

(21) Appl. No.: 14/390,807

(22) PCT Filed: Oct. 31, 2013

(86) PCT No.: PCT/US2013/067767
§ 371 (c)(1),
(2) Date: Oct. 6, 2014

(87) PCT Pub. No.: WO2015/065432
PCT Pub. Date: May 7, 2015

(65) Prior Publication Data
US 2016/0259749 A1 Sep. 8, 2016

(51) Int. Cl.
*G06F 13/40* (2006.01)
*H01R 13/66* (2006.01)
(Continued)

(52) U.S. Cl.
CPC ........ *G06F 13/4068* (2013.01); *G06F 13/385* (2013.01); *G06F 13/4081* (2013.01);
(Continued)

(58) Field of Classification Search
CPC H01R 13/6683; H01R 13/6691; H01R 24/64; G06F 13/4068; G06F 13/4081; G06F 13/4086
(Continued)

(56) References Cited

U.S. PATENT DOCUMENTS 5,055,058 A 10/1991 Nagasaka et al.
5,112,246 A 5/1992 Kawase et al.
(Continued)

OTHER PUBLICATIONS

International Patent Application No. PCT/US2013/067767, International Search Report and Written Opinion mailed Jul. 25, 2014, 16 pages.

*Primary Examiner* — Glenn A Auve
(74) *Attorney, Agent, or Firm* — Fogg & Powers LLC

(57) ABSTRACT

A communication device is provided. The communication device can include a processing device for communicating data via a data connection or receiving power via an electrical connection and a connector for providing the data connection or electrical connection. The connector can include at least one terminal and a sensing module. The terminal can be communicatively coupled to the processing device. The terminal can form the data connection or electrical connection with at least one external terminal of a mating connector. The sensing module can detect a movement associated with removing the mating connector. The sensing module can provide a termination signal to the processing device to terminate the data connection or electrical connection. The processing device can terminate data communication via the data connection or current flow via the electrical connection in response to the termination signal.

16 Claims, 8 Drawing Sheets

(51) Int. Cl.
  *G06F 13/38* (2006.01)
  *G06F 13/42* (2006.01)
  *H01R 24/64* (2011.01)
  *H01R 107/00* (2006.01)

(52) U.S. Cl.
  CPC ...... *G06F 13/4086* (2013.01); *G06F 13/4265* (2013.01); *H01R 13/6683* (2013.01); *H01R 13/6691* (2013.01); *H01R 24/64* (2013.01); *H01R 2107/00* (2013.01); *Y02B 60/1228* (2013.01); *Y02B 60/1235* (2013.01)

(58) Field of Classification Search
  USPC .................................................. 713/301–304
  See application file for complete search history.

(56) References Cited

U.S. PATENT DOCUMENTS

| | | | |
|---|---|---|---|
| 5,120,255 A | 6/1992 | Kouda et al. | |
| 5,174,785 A | 12/1992 | Endo et al. | |
| 5,391,087 A | 2/1995 | Fukuda | |
| 5,417,586 A | 5/1995 | Endo et al. | |
| 5,483,573 A | 1/1996 | Steenton et al. | |
| 5,775,936 A | 7/1998 | Tsuji | |
| 6,045,395 A | 4/2000 | Saito et al. | |
| 6,095,837 A | 8/2000 | David et al. | |
| 6,126,480 A | 10/2000 | Kawase et al. | |
| 6,185,645 B1 | 2/2001 | Klein et al. | |
| 6,247,957 B1 | 6/2001 | Hasegawa | |
| 6,648,669 B1 | 11/2003 | Kim et al. | |
| 7,431,601 B2 | 10/2008 | Nugent, Jr. et al. | |
| 7,641,477 B2 | 1/2010 | DiFonzo et al. | |
| 8,328,433 B2 | 12/2012 | Furuyama | |
| 8,441,151 B2 | 5/2013 | Huang | |
| 8,947,106 B2 * | 2/2015 | Michaelis | G01R 31/043 324/647 |
| 2004/0161964 A1* | 8/2004 | Liebenow | H01R 13/64 439/488 |
| 2005/0227524 A1* | 10/2005 | Zhuang | H01R 13/7035 439/188 |
| 2008/0031366 A1* | 2/2008 | Lin | G06F 13/387 375/257 |
| 2009/0167099 A1* | 7/2009 | Chin | H03K 17/002 307/125 |
| 2010/0255698 A1 | 10/2010 | Chen | |
| 2011/0012727 A1* | 1/2011 | Pance | G06F 13/4068 340/505 |
| 2012/0187961 A1 | 7/2012 | Hashim et al. | |
| 2013/0237085 A1 | 9/2013 | Kim et al. | |
| 2014/0087585 A1* | 3/2014 | Anastas | H01R 13/641 439/489 |

* cited by examiner

CONNECTOR WITH A TERMINATION MODULE

CROSS-REFERENCE TO RELATED APPLICATION

This is a U.S. national phase application under 35 U.S.C. 371 of International Patent Application No. PCT/US2013/067767 filed Oct. 31, 2013 and titled "Connector with a Termination Module," the entirety of which is incorporated herein by reference.

TECHNICAL FIELD

The present disclosure relates generally to telecommunications equipment and more particularly (although not necessarily exclusively) to a connector with a termination module.

BACKGROUND

A telecommunication system may include components connected via communication cables such as copper or fiber optic cables. Communication cables include connectors, such as RJ-45 jacks and RJ-45 connectors, for forming electrical or data connections. RJ-45 connections can be used for both data communications and for powering remote devices. For cases in which current provided to a powered device is high, arcing can occur when an electrical connection between a connector in the powered device and a connector in a cable from a powering device is broken. Arcing can damage or degrade the performance of the contacts in one or both of the connectors.

SUMMARY

Certain aspects and features of the present disclosure are directed to a connector with a termination module.

In one aspect, a communication device is provided. The communication device can include a processing device for communicating data via a data connection and a connector for providing the data connection. The connector can include a housing, a terminal, and a sensing module. The housing can define an opening for receiving a mating connector. The terminal can be communicatively coupled to the processing device. The terminal can form the data connection with an external terminal of the mating connector. The sensing module can detect a movement associated with removing the mating connector from the opening. The sensing module can provide a termination signal to the processing device to terminate the data connection. The processing device can terminate data communication via the data connection in response to the termination signal.

In another aspect, a communication device is provided. The communication device can include a processing device that can receive power via an electrical connection and a connector for providing the electrical connection. The connector can include a housing, a terminal, and a sensing module. The housing can define an opening for receiving a mating connector. The terminal communicatively can be electrically coupled to the processing device. The terminal can form the electrical connection with an external terminal of the mating connector. The sensing module can include an additional processing device, a first conductive contact communicatively coupled to the additional processing device, and a second conductive contact positioned through the housing. The second conductive contact can be moved between a first position in which the first and second conductive contacts are electrically connected and a second position in which the first and second conductive contacts are electrically disconnected. The additional processing device can detect movement of the second conductive contact between the first and second positions. The additional processing device can provide a termination signal to the processing device in response to the second conductive contact being moved between the first and second positions. The processing device can terminate a current flow via the electrical connection in response to the termination signal.

In another aspect, a method is provided. The method involves providing a data connection between a communication device and an additional communication device. The data connection can be formed by connecting a terminal of a connector included in the communication device to an external terminal of a mating connector of a communication cable. The method further involves a sensing module detecting a movement associated with removing the mating connector from the connector. The method further involves the sensing module providing a termination signal to the communication device to terminate the data connection. The method further involves terminating data communication via the data connection in response to the termination signal.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
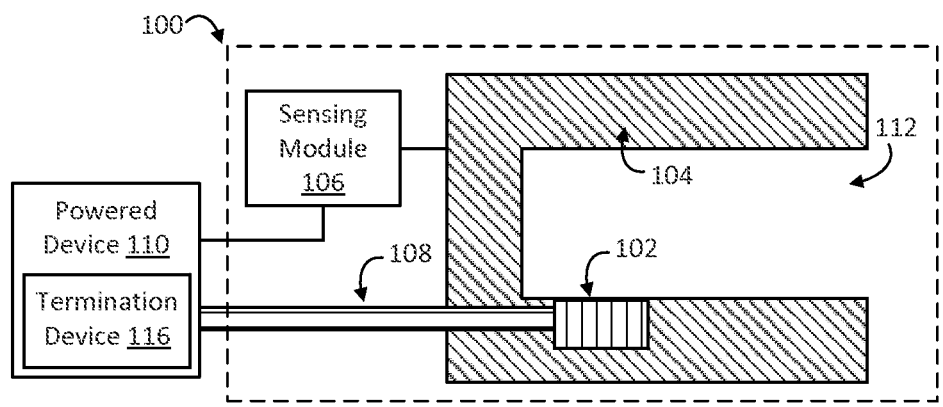
FIG. 1 is a lateral, cross-section view of a connector with a sensing module for terminating an electrical connection with a powered device according to one aspect.

Certain aspects and examples are directed to a cable connector with a termination module. For example, the termination module can include a sensing module communicatively coupled to a powered device that includes the connector. The sensing module can cause the powered device to cease or reduce a current flow over an electrical connection or data communication over a data connection prior to removing a mating connector from the connector.

The connector can include at least one terminal and the sensing module. The terminal of the connector can be a conductor that forms an electrical connection with a terminal of a mating connector when the mating connector is inserted in or otherwise coupled to the connector. A mating connector can include any connector configured to be electrically connected to the connector. For example, the connector may be an RJ-45 jack and the mating connector may be an RJ-45 plug. The electrical connection can be used to provide one or both of power or data to a device that includes the connector. The sensing module can be used to determine that the additional connector is to be disconnected from the connector. For example, a sensor of the sensing module may be triggered by depressing a retaining tab of an RJ-45 mating connector or otherwise manipulating the mating connector in the connector prior to removing the mating connector from the connector. The sensing module can cause a termination signal to be communicated to the powered device in response to the movement or manipulation of the mating connector. The termination signal can instruct the device to terminate the electrical connection or data connection. Terminating the electrical connection can include the powered device reducing or eliminating current flow through the electrical connection. Terminating the electrical connection before the additional connector is disconnected from the connector can reduce or prevent arcing caused by physically disconnecting the contacts of the connector and the contacts of the electrical connector.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The following aspects and examples use directional descriptions such as "upward," "downward," "left," "right," "lateral," etc. in relation to the illustrative examples as they are depicted in the figures, the upward direction being toward the top of the corresponding figure, the downward direction being toward the bottom of the corresponding figure, the leftward direction being toward the left of the corresponding figure, and the rightward direction being toward the right of the corresponding figure.

FIG. 1 is a lateral, cross-section view of a connector 100 with a sensing module 106 for terminating an electrical connection with a powered device 110. For example, the connector 100 may be an RJ-45 connector or other suitable connector for providing power or data to a powered device 110. A non-limiting example of a powered device 110 is a remote antenna unit or other access point of a distributed antenna system.

The connector 100 can include a terminal 102, a housing 104, and a sensing module 106. The terminal 102 can include one or more conductors used to form an electrical connection or data connection with a terminal of a mating connector. For example, in a connector 100 such as an RJ-45 jack, the terminal 102 can include a set of electrical contacts that can be connected to the wires of an Ethernet cable via a corresponding set of electrical contacts in an RJ-45 plug or other suitable mating connector.

The terminal 102 can be positioned in the housing 104. The housing 104 can be formed from any suitable electrically insulating or dielectric material. Non-limiting examples of a suitable insulating or dielectric material include a plastic material that meets applicable standards with respect to electrical insulation and flammability, such as Polyvinyl Chloride ("PVC"), Acrylonitrile Butadiene Styrene ("ABS"), polycarbonate, etc.

The housing 104 can define an opening 112 into which a mating connector (e.g., an RJ-45 plug) can be inserted. At least a portion of terminal 102 can be exposed to the opening 112. The terminal 102 can form an electrical connection or data connection with a terminal of the inserted mating connector. The terminal 102 can be coupled to the powered device 110 via a suitable conductor 108.

The sensing module 106 can be used to detect one or more of the presence, removal, movement, or other manipulation of a mating connector inserted in the connector 100. The sensing module 106 can include one or more components electrically or communicatively coupled via a suitable interconnection mechanism, such as a printed circuit board. The sensing module 106 can be communicatively coupled to the powered device 110. The sensing module 106 can provide a termination signal to the powered device 110 in response to detecting the movement or manipulation of a mating connector inserted in the connector 100.

The termination signal can cause the powered device 110 to terminate the electrical connection or data connection. In some aspects, the termination device can include a processing device. The termination signal can instruct the processing device to configure the powered device 110 to terminate the electrical connection or data connection. Non-limiting examples of a such a processing device include a microprocessor, an application-specific integrated circuit ("ASIC"), a field-programmable gate array ("FPGA"), or other suitable processor. The processing device may include one processor or any number of processors. Terminating the electrical connection can include the powered device reducing or eliminating current flow through the electrical connection. Terminating the electrical connection before the additional connector is disconnected from the connector 100 can reduce or prevent arcing caused by physically disconnecting the contacts of the connector 100 and the contacts of the electrical connector. In other aspects, the termination device 116 can include a mechanical or electrical switch in a path of the electrical or data connection provided by the connector 100. The termination signal can be an electrical signal that causes the mechanical or electrical switch to move from a closed position to an open position. Moving the mechanical or electrical switch from the closed position to the open position can cause the electrical or data connection to cease.

The powered device 110 can terminate the electrical connection or data connection using any suitable process or mechanism. In one non-limiting example, the powered device 110 may terminate the electrical connection or data connection by opening one or more switches in an electrical or signal path that includes the terminal 102. In another non-limiting example, the powered device 110 may terminate the electrical connection or data connection by powering down one or more load devices in the powered device 110 that receive data or power via the terminal 102.

In some aspects, the connector 100 and powered device 110 can be included in a communication device, such as a remote antenna unit of a distributed antenna system. A termination device 116 that is a processing device can respond to a termination signal by performing one or more operations associated with communicating voice or data to other communication devices in a telecommunication system. For example, the termination device 116 may respond to a termination signal by identifying a host communication device in communication with the communication device via a data connection provided by the terminals 102, 204. Non-limiting examples of a host communication device include a base transceiver station in a telecommunication system or a master unit in a distributed antenna system. The termination device 116 may notify the host communication device that the data connection is to be terminated. The termination device 116 may also identify state data for the communication device. For example, the communication device may periodically transmit data to the host communication device that describes one or more operating parameters of the communication device. The termination device 116 may transmit the state data to the host communication device before terminating a data connection or electrical connection. Transmitting the state data to the host communication device before terminating a data connection or electrical connection can ensure that the host communication device possesses the most recent state data for the communication device.

Figure 2:
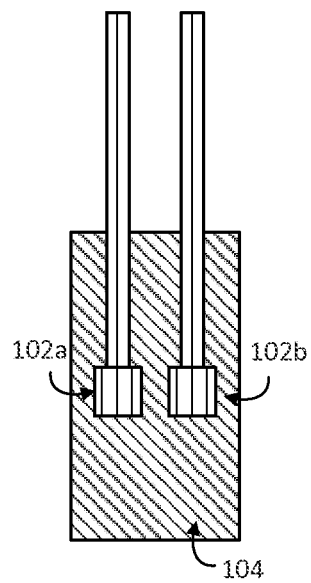
FIG. 2 is a vertical, cross-section view of the connector of FIG. 1 according to one aspect.

Although FIG. 1 depicts a single terminal 102 positioned in a bottom portion of the housing 104 for illustrative purposes, the connector 100 can include any suitable number of terminals positioned anywhere in the housing 104. For example, FIG. 2 is a vertical, cross-section view of the connector of FIG. 1. The connector 100 can include terminals 102a, 102b. Each of the terminals 102a, 102b can form an electrical or data connection with a respective terminal of a mating connector. For example, terminal 102a can form an electrical connection for providing power to the powered device 110 and terminal 102b can form a data connection for communicating data with the powered device 110.

In some aspects, power can be delivered via Power-over-Ethernet from power source equipment, such as a master unit of a distributed antenna system. The powered device 110 can receive power from power source equipment via one of the terminals 102a, 102b and communicate data via another one of the terminals 102a, 102b. The powered device 110 can include magnetics or other suitable components for extracting power from one of the terminals 102a, 102b forming an electrical connection. The powered device can also include a physical layer device for receiving and routing the data extracted from another one of the terminals 102a, 102b forming a data connection. In some aspects, data and power can be provided via one or both of the terminals 102a, 102b. Current can be provided to the powered device 110 over one of the terminals 102a, 102b and can be received by the other of the terminals 102a, 102b. In additional or alternative aspects, the connector 100 can include additional terminals, such as a pair of terminals for respectively providing and receiving current over an electrical connection and at least one additional terminal for communicating data over a data connection.

In other aspects, the powered device 110 can receive data and power over a coaxial cable having a mating connector coupled to the connector 100. The coaxial cable can include an electrical cable with a center conductor, a tubular insulating layer disposed radially exterior to the center conductor, and a tubular shield conductor disposed radially exterior to the tubular insulating layer. Power can be provided over the coaxial cable by providing current from a power source to the center conductor and receiving return current via the shield conductor. Current can be provided to the center conductor via a device such as a bias T. The terminals 102a, 102b can be positioned to electrically connect to the inner and outer conductors of a mating connector such a coaxial cable connector.

Figure 3:
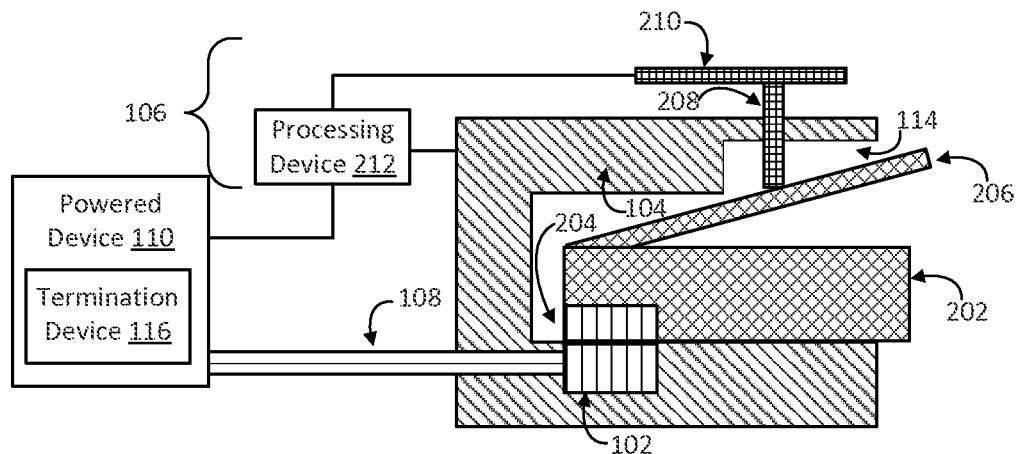
FIG. 3 is a lateral, cross-sectional view of an example of a connector that includes a terminal and a sensing module actuated by a retaining tab of a mating connector according to one aspect.

In some aspects, the sensing module can include a switch or sensor for detecting the movement of a retaining tab of a mating connector inserted into the connector. For example, FIG. 3 is a lateral, cross-sectional view of an example of a connector 100 that includes a terminal 102 and a sensing module 106 actuated by a retaining tab 206 of a mating connector 202. The housing 104 of the connector 100 can define a groove 114 for receiving the retaining tab 206.

The mating connector 202 can include a terminal 204 and the retaining tab 206. Inserting the mating connector 202 into the connector 100 can cause the terminal 204 to contact the terminal 102. Contact between the terminals 102, 204 can form an electrical connection. The electrical connection can allow electrical signals to be communicated between the terminals 102, 204. The terminals 102, 204 may be formed from any suitable conductive material. Non-limiting examples of suitable conductive material include copper or copper alloys.

The retaining tab 206 can be a flexible or otherwise movable portion of the mating connector 202. The retaining tab 206 can apply a force to a portion of the housing 104 of the connector 100 that can retain the mating connector 202 in the connector 100.

FIG. 3 depicts a sensing module 106 that includes conductive contacts 208, 210 and a processing device 212. The contacts 208, 210 can be part of a switch or sensor. The contact 208 can be positioned through the housing 104 and in the groove 114. The retaining tab 206 can apply a force to the contact 208 that causes the contact 208 to be electrically coupled to the contact 210. The processing device 212 can be coupled to one or both of the contacts 208, 210. The processing device 212 can detect that the contacts 208, 210 are electrically coupled with one another. Non-limiting examples of a processing device 212 include a microprocessor, an ASIC, an FPGA, or other suitable processor. The processing device 212 may include one processor or any number of processors.

Figure 4:
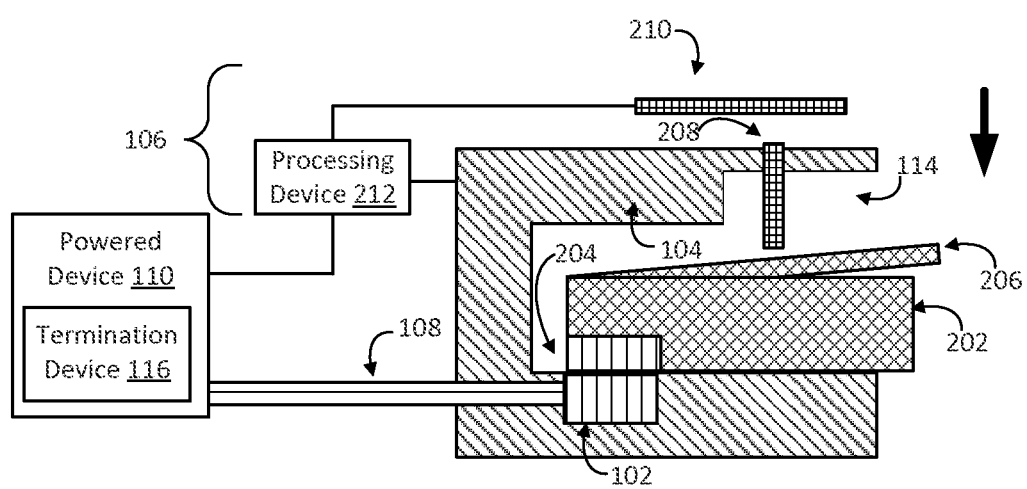
FIG. 4 is a lateral, cross-sectional view of the connector of FIG. 3 with the sensing module actuated by depressing the retaining tab according to one aspect.

Depressing the retaining tab 206 can actuate the sensing module 106. FIG. 4 is a lateral, cross-sectional view of the connector 100 of FIG. 3 with the sensing module 106 actuated by depressing the retaining tab 206. The retaining tab 206 can be depressed by applying a force to the retaining tab 206 in the direction of the mating connector 202, as depicted by the downward arrow in FIG. 4.

Depressing the retaining tab 206 can remove a forced exerted by the retaining tab 206 against the contact 208. Removing the force exerted against the contact 208 cause the contact 208 to move away from the contact 210. In some aspects, a spring or other biasing component (not depicted) can apply a force to the contact 208 that moves the contact 208 away from the contact 210 in response to the retaining tab 206 being depressed. The processing device 212 can detect a separation of the contact 208 from the contact 210. The processing device 212 can respond to detecting the separation between the contacts 208, 210 by providing a termination signal to the powered device 110.

In other aspects, the sensing module 106 can be actuated by movement of the body of the mating connector 202. For example, FIG. 5 is a lateral, cross-sectional view of an example of a connector 100 that includes a terminal 102 and a sensing module 106 actuated by the body of a mating connector 202.

Figure 5:
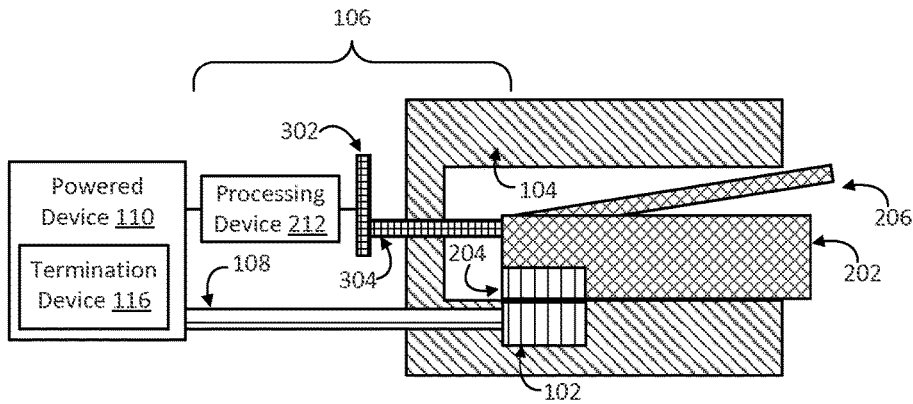
FIG. 5 is a lateral, cross-sectional view of an example of a connector that includes a terminal and a sensing module actuated by the body of a mating connector according to one aspect.

FIG. 5 depicts a sensing module 106 that includes conductive contacts 302, 304. The contacts 302, 304 can be part of a switch or sensor. The contact 304 can be positioned through the housing 104 of the connector 100. The processing device 212 can be communicatively coupled to one or both of the contacts 302, 304. The mating connector 202 being inserted into the connector 100 can cause a non-conducting portion of the mating connector 202 to apply a force to the contact 304. The force applied to the contact 304 can cause the contact 304 to be electrically coupled to the contact 302. The processing device 212 can detect that the contacts 302, 304 are electrically coupled with one another.

Figure 6:
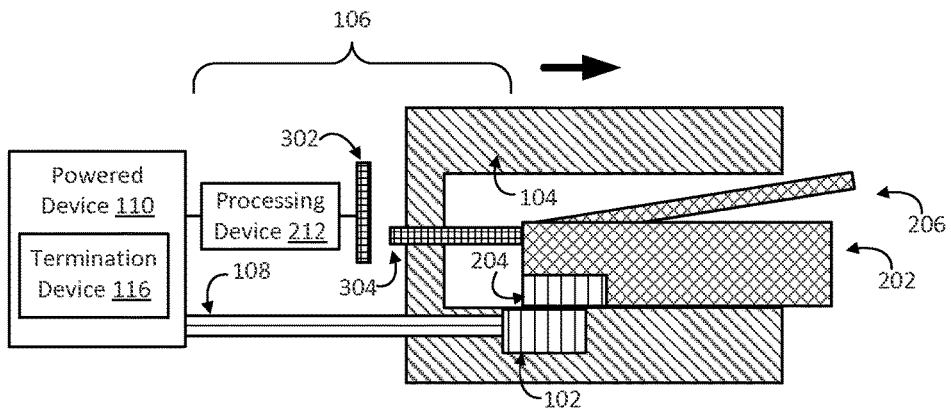
FIG. 6 is a lateral, cross-sectional view of the connector of FIG. 5 with the sensing module actuated by unseating the mating connector according to one aspect.
Figure 7:
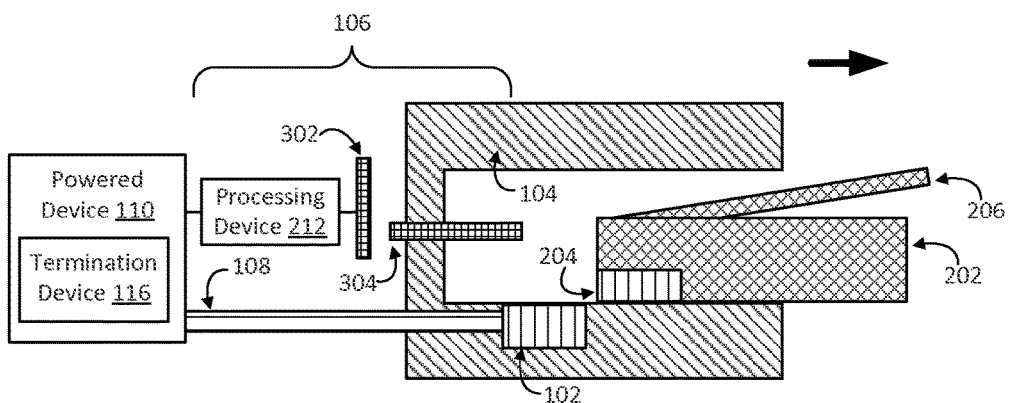
FIG. 7 is a lateral, cross-sectional view of the connector of FIGS. 5-6 being disconnected from the mating connector according to one aspect.

FIG. 6 is a lateral, cross-sectional view of the connector 100 of FIG. 5 with the sensing module 106 actuated by unseating the mating connector 202. A force applied to the mating connector 202 can partially remove the mating connector 202 from the connector 100, as depicted by the rightward arrow in FIG. 6. Partially removing the mating connector 202 can cause the contact 304 to move away from the contact 302 without disconnecting the terminals 102, 204. In some aspects, a spring or other biasing component (not depicted) can apply a force to the contact 304 that moves the contact 304 away from the contact 302 in response to the retaining tab 206 being depressed. The processing device 212 can detect a separation of the contact 304 from the contact 302. The processing device 212 can respond to detecting the separation between the contacts 304, 302 by providing a termination signal to the powered device 110. The powered device 110 can respond to the termination signal by terminating or reducing a flow of electrical current between the terminals 102, 204. The terminals 102, 204 can be electrically disconnected from one another by continuing to remove the mating connector 202 from the connector 100, as depicted by the rightward arrow in FIG. 7. Terminating the flow of electrical current between the terminals 102, 204 prior to breaking contact between the terminals 102, 204 can prevent arcing or other negative effects associated with physically disconnecting the terminals 102, 204 while current is flowing through the terminals 102, 204.

In additional or alternative aspects, the sensing module 106 can provide a termination signal in response to the mating connector 202 causing two contacts to move closer together. For example, FIG. 8 is a lateral, cross-sectional view of an alternative example of a connector 100 that includes a terminal 102 and a sensing module 106 actuated by the body of a mating connector.

Figure 8:
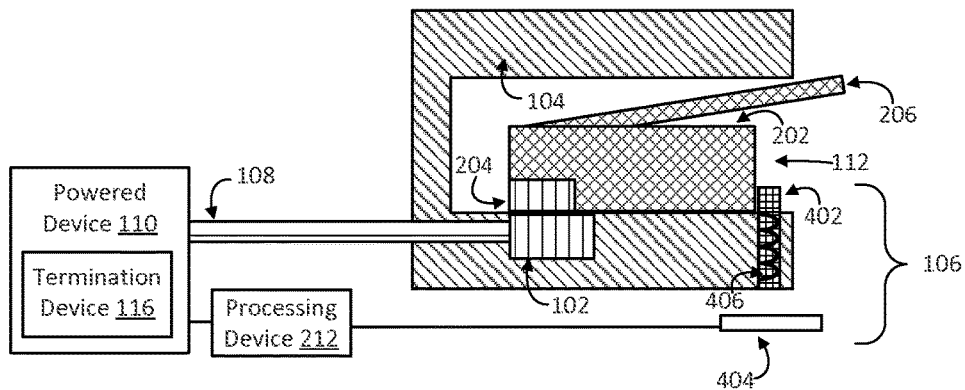
FIG. 8 is a lateral, cross-sectional view of an alternative example of a connector that includes a terminal and a sensing module actuated by the body of a mating connector according to one aspect.

FIG. 8 depicts a sensing module 106 that includes conductive contacts 402, 404. The contacts 402, 404 can be part of a switch or sensor. The contact 404 can be positioned through the housing 104 of the connector 100. The processing device 212 can be communicatively coupled to one or both of the contacts 402, 404.

A spring 406 or other biasing component can apply a force to the contact 402. The mating connector 202 being positioned in the opening 112 adjacent to the contact 402 can allow the force exerted by the spring 406 to move the contact 402 at least partially into the opening 112. The contact 402 being positioned at least partially in the opening 112 can prevent the contact 402 from contacting or being in proximity to the contact 404. The processing device 212 can detect that the contacts 402, 404 are not electrically coupled to one another.

Figure 9:
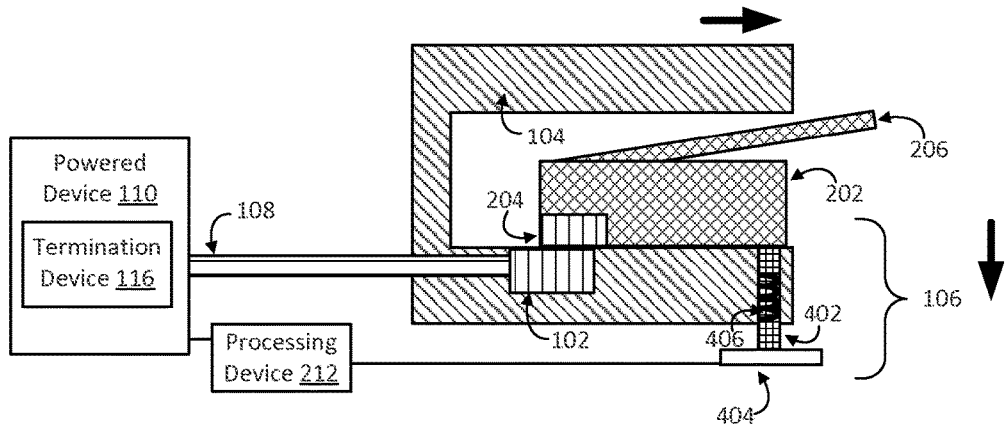
FIG. 9 is a lateral, cross-sectional view of the connector of FIG. 8 with the sensing module actuated by unseating the mating connector according to one aspect.

FIG. 9 is a lateral, cross-sectional view of the connector 100 of FIG. 8 with the sensing module 106 actuated by unseating the mating connector 202. A force applied to the mating connector 202 can partially remove the mating connector 202 from the connector 100, as depicted by the rightward arrow in FIG. 9. Partially removing the mating connector 202 can cause the body of the mating connector 202 to apply a force to the contact 402, as depicted by the downward arrow in FIG. 9. Applying the force to the contactor 402 can cause the spring 406 to compress and the contact 402 to be electrically coupled to the contact 404 without disconnecting the terminals 102, 204.

Figure 10:
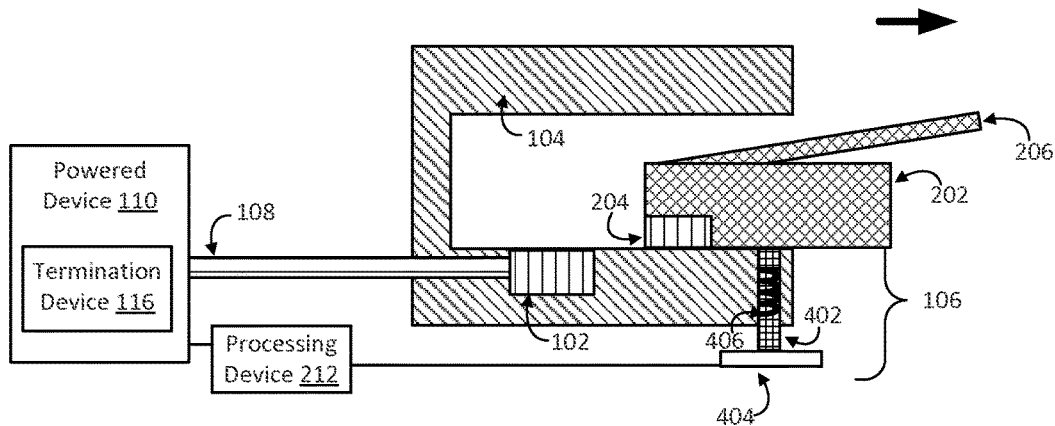
FIG. 10 is a lateral, cross-sectional view of the connector of FIGS. 8-9 being disconnected from the mating connector according to one aspect.

The processing device 212 can detect that the contacts 402, 404 electrically coupled to one another. The processing device 212 can respond to detecting electrical coupling between the contacts 402, 404 by providing a termination signal to the powered device 110. The powered device 110 can respond to the termination signal by terminating or reducing a flow of electrical current between the terminals 102, 204. The terminals 102, 204 can be electrically disconnected from one another by continuing to remove the mating connector 202 from the connector 100, as depicted by the rightward arrow in FIG. 10. Terminating or reducing the flow of electrical current between the terminals 102, 204 prior to breaking contact between the terminals 102, 204 can prevent arcing or other negative effects associated with physically disconnecting the terminals 102, 204 while current is flowing.

Figure 11:
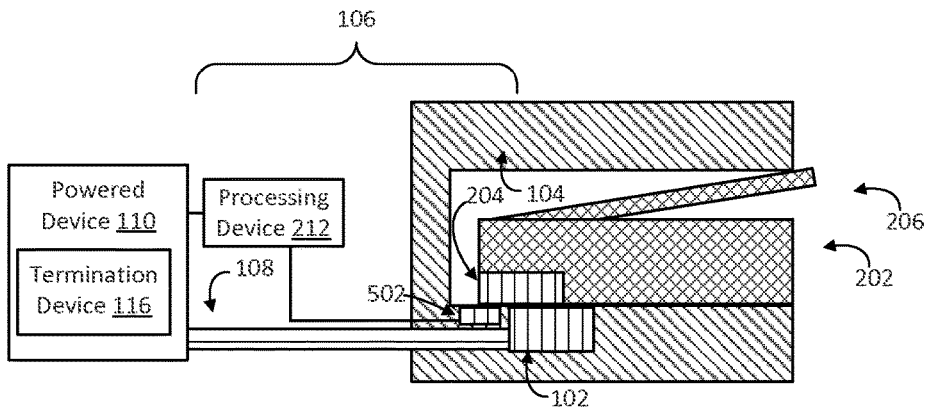
FIG. 11 is a lateral, cross-sectional view of an example of a connector that includes a terminal and a sensing module actuated via an electrical connection with a mating connector according to one aspect.

In additional or alternative aspects, the sensing module 106 can provide a termination signal based on an electrical connection between the sensing module 106 and the terminal 204 of the mating connector 202. For example, FIG. 11 is a lateral, cross-sectional view of an example of a connector 100 that includes a terminal 102 and a sensing module 106 actuated via an electrical connection with the mating connector 202. The sensing module 106 can include a terminal 502 communicatively coupled to the processing device 212. The terminal 502 can be positioned in the housing 104 of the connector 100. The mating connector 202 being inserted into the connector 100 can cause the terminal 502 to form an electrical connection with the terminal 204 of the mating connector 202.

Figure 12:
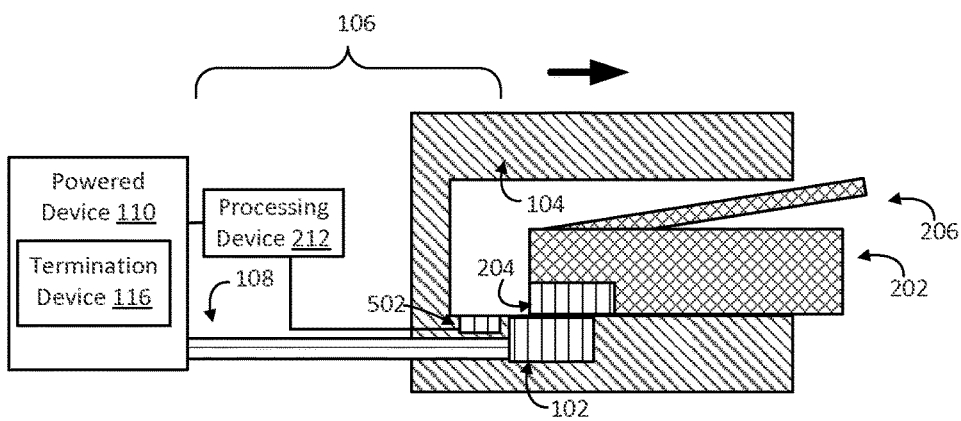
FIG. 12 is a lateral, cross-sectional view of the connector of FIG. 11 with the sensing module actuated by unseating the mating connector according to one aspect.

Partially removing the mating connector 202 can electrically disconnect the terminals 204, 502 from one another. For example, FIG. 12 is a lateral, cross-sectional view of the connector 100 of FIG. 11 with the sensing module 106 actuated by unseating the mating connector 202. The mating connector 202 can be partially removed by applying a force to the mating connector 202 in a direction away from the connector 100, as depicted by the rightward arrow in FIG. 12. The movement depicted in FIG. 12 can disconnect the terminals 204, 502 without disconnecting the terminals 102, 204. The electrical connection between the terminals 204, 502 can involve a lower current flow than the electrical connection between the terminals 102, 204. For example, the current flow between the terminals 204, 502 can be great enough to allow the processing device 212 to detect the electrical connection between the terminals 204, 502 and low enough to prevent arcing caused by physically disconnecting the terminals 204, 502 from one another.

Figure 13:
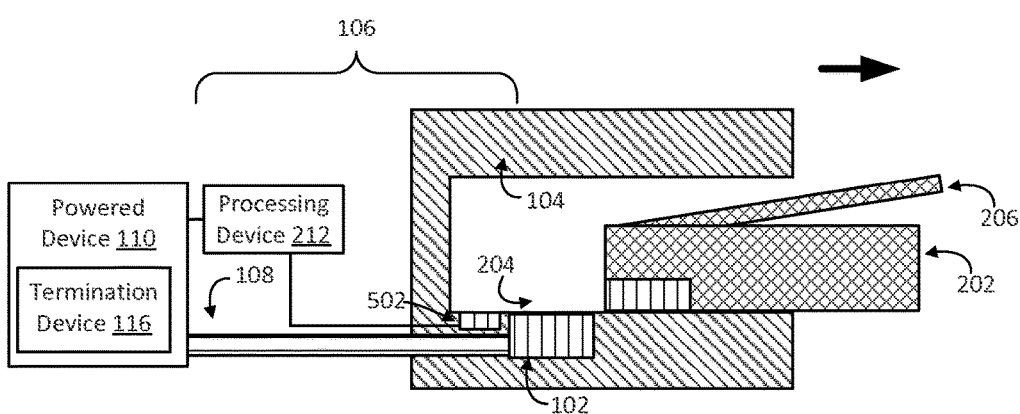
FIG. 13 is a lateral, cross-sectional view of the connector of FIGS. 11-12 being disconnected from the mating connector according to one aspect.

The processing device 212 can respond to detecting a disconnection of the terminal 502 from the terminal 204 by providing a termination signal to the powered device 110. The powered device 110 can respond to the termination signal by terminating or reducing a flow of electrical current between the terminals 102, 204. The terminals 102, 204 can be electrically disconnected from one another by continuing to remove the mating connector 202 from the connector 100, as depicted by the rightward arrow in FIG. 13.

Figure 14:
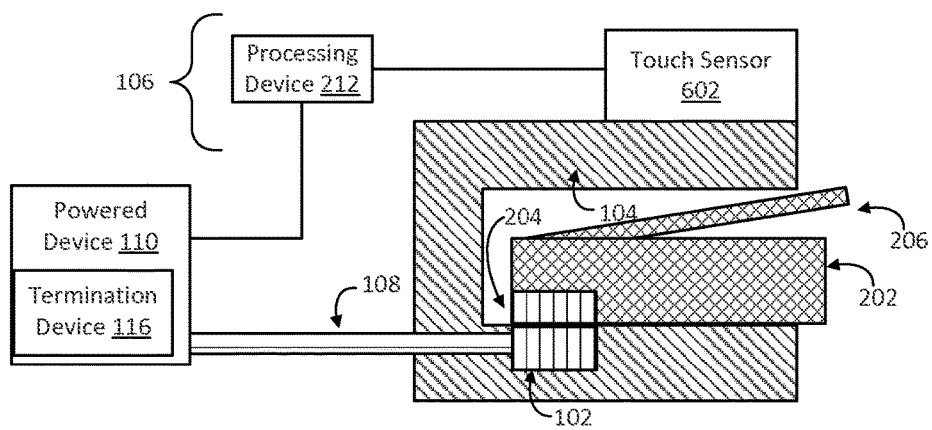
FIG. 14 is a lateral, cross-sectional view of an example of a connector that includes a terminal and a sensing module actuated by a touch sensor according to one aspect.
Figure 15:
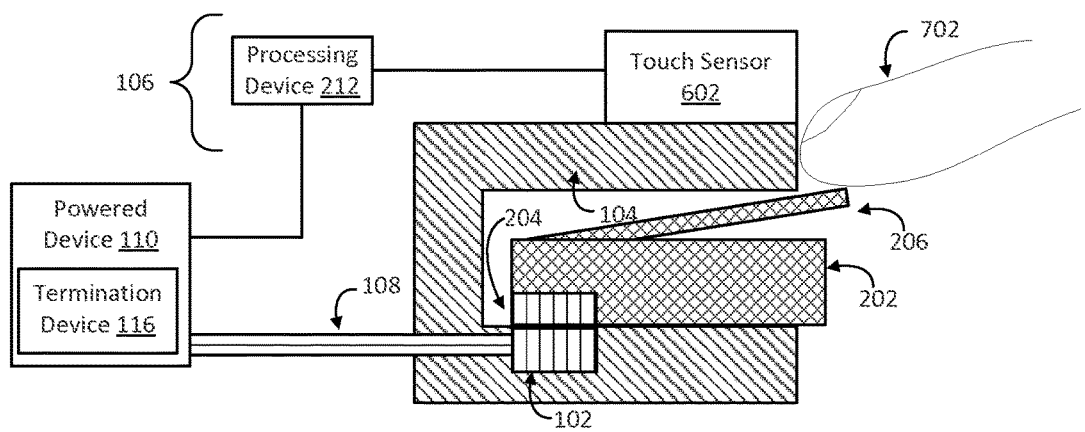
FIG. 15 is a lateral, cross-sectional view of the connector of FIG. 3 with the sensing module actuated by touching the touch sensor according to one aspect.

In additional or alternative aspects, the sensing module 106 can include a touch sensor for detecting the presence of a finger or other object used to remove a mating connector 202 from the connector 100. For example, FIG. 14 is a lateral, cross-sectional view of an example of a connector 100 that includes a terminal 102 and a sensing module 106 actuated by a touch sensor 602. The touch sensor 602 can be communicatively coupled to the processing device 212. Non-limiting examples of a touch sensor 602 include a resistive sensor or a capacitive sensor. FIG. 15 is a lateral, cross-sectional view of the connector 100 of FIG. 3 with the sensing module 106 actuated by touching the touch sensor 602. The touch sensor 602 can detect an object near the connector, such as a finger 702 disengaging the retaining tab 206. The processing device 212 can respond to the touch sensor 602 detecting the finger 702 or other object by providing a termination signal to the powered device 110.

In other aspects, the sensing module 106 can be actuated by detecting movement of a barrier adjacent to an opening of the connector 100. For example, FIG. 16 is a lateral, cross-sectional view of an example of a connector 100 that includes a terminal 102 and a sensing module 106 actuated by movement of a barrier 806.

Figure 16:
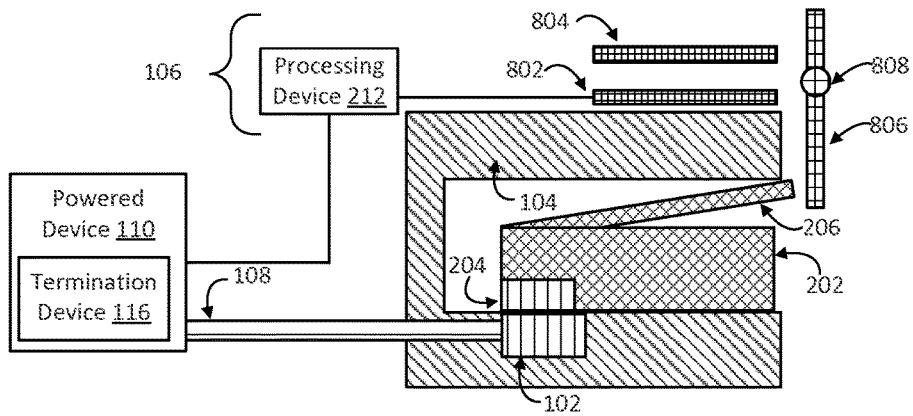
FIG. 16 is a lateral, cross-sectional view of an example of a connector that includes a terminal and a sensing module actuated by movement of a barrier according to one aspect.

FIG. 16 depicts a sensing module 106 that includes conductive contacts 802, 804 and the barrier 806. The contacts 802, 804 can be part of a switch or sensor. The contacts 802, 804 can be positioned adjacent to the housing 104 of the connector 100. The processing device 212 can be communicatively coupled to one or both of the contacts 802, 804.

The barrier 806 can be coupled to or otherwise include a hinge 806 or other structure allowing movement of the barrier 806. The barrier 806 can be moved between a closed position and an open position. In a closed position, the barrier 806 can at least partially obstruct access to a mating connector 202 inserted in the connector 100, as depicted in FIG. 16. In some aspects, a spring or other biasing component (not depicted) can apply a force to the barrier 804 that maintains the barrier 806 in a closed position. In an open position, the barrier 806 can apply a force to the contact 804. The force applied to the contact 804 can cause the contact 804 to be electrically coupled to the contact 802. The processing device 212 can detect a presence or absence of electrical coupling between the contacts 802, 804.

Figure 17:
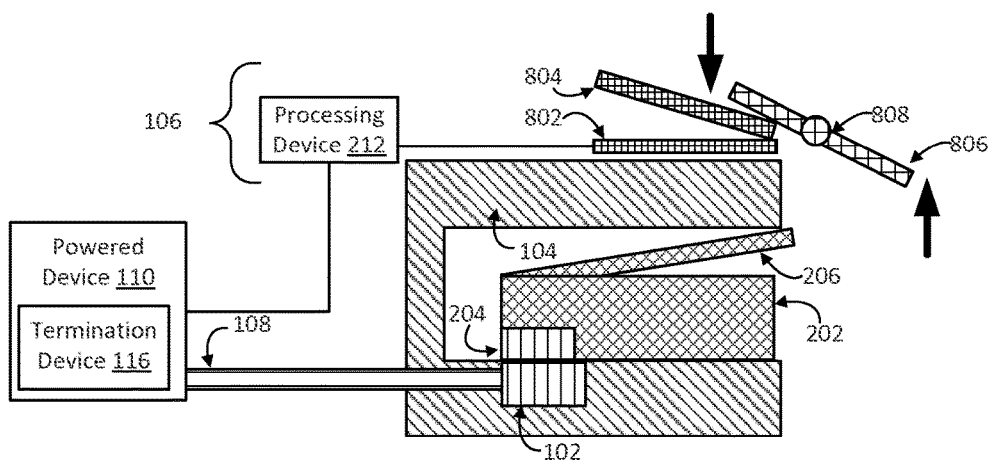
FIG. 17 is a lateral, cross-sectional view of the connector of FIG. 16 with the sensing module actuated by movement of the barrier according to one aspect.

FIG. 17 is a lateral, cross-sectional view of the connector 100 of FIG. 16 with the sensing module 106 actuated by moving the barrier 806 from the closed position to the open position. An upward force applied to the barrier 806 can rotate or otherwise move the barrier 806 to the open position, as depicted by the upward arrow in FIG. 17. Movement of the barrier 806 can cause the barrier 806 to apply a downward force to the contact 804, as depicted by the downward arrow in FIG. 18. The downward force can move the contact 804 to a position in which the contacts 802,804 are electrically coupled with one another.

The processing device 212 can detect an electrical coupling of the contacts 802, 804. The processing device 212 can respond to detecting the electrical coupling of the contacts 802, 804 by providing a termination signal to the powered device 110. The powered device 110 can respond to the termination signal by terminating or reducing a flow of electrical current between the terminals 102, 204. The terminals 102, 204 can be electrically disconnected from one another by continuing to remove the mating connector 202 from the connector 100. Terminating the flow of electrical current between the terminals 102, 204 prior to breaking contact between the terminals 102, 204 can prevent arcing or other negative effects associated with physically disconnecting the terminals 102, 204 while current is flowing through the terminals 102, 204.

Figure 18:
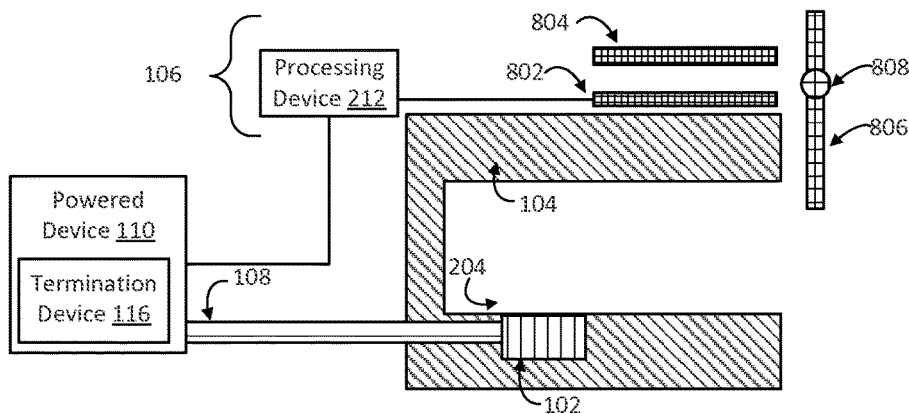
FIG. 18 is a lateral, cross-sectional view of the connector of FIG. 16 with the barrier returned to a closed position according to one aspect.

In the absence of the mating connector 202, the barrier 806 can return to the closed position, as depicted in FIG. 18.

Figure 19:
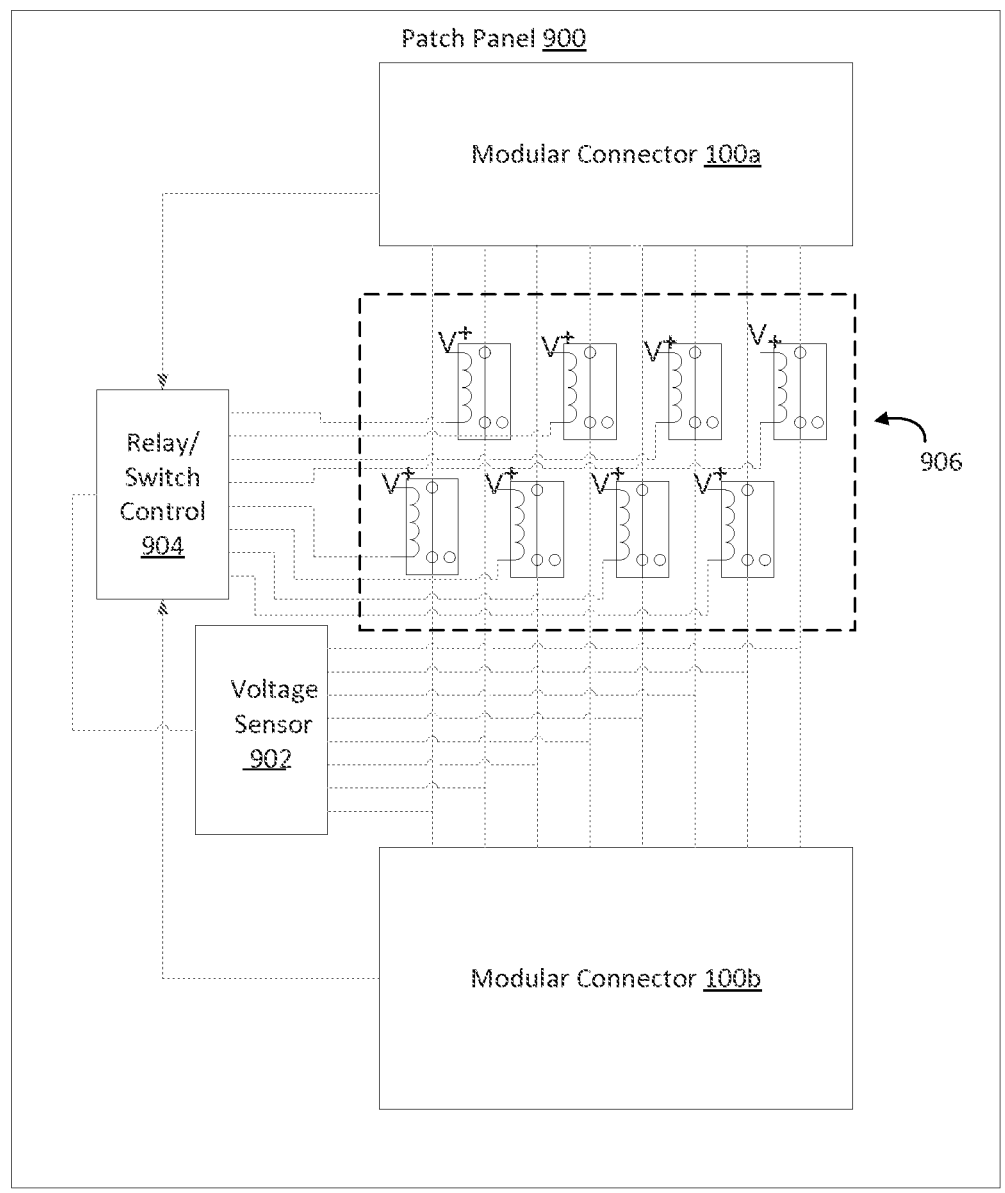
FIG. 19 is a block diagram of a patch panel using connectors with termination modules according to one aspect.

In some aspects, one or more connectors 100 can be used in a device that is used to switch or interconnect devices, such as a patch panel. For example, FIG. 19 is a block diagram of a patch panel 900 using connectors 100a, 100b. A patch panel 900 or other similar device can include a connector 100a electrically coupled to a connector 100b via contact circuits 906. The patch panel 900 can also include a voltage sensor 902. The voltage sensor 902 can be communicatively coupled to a relay/switch control 904. The relay/switch control 904 can use the voltage sensor 902 to determine which of the contact circuits 906 between connectors 100a, 100b are used for transporting power. A mating connector being removed from at least one of the connectors 100a, 100b can cause a sensing module in one or both of the connectors 100a, 100b to generate a termination signal. The termination signal can be provided to the relay/switch control 904. The termination signal can cause the relay/switch control 904 to terminate the electrical connection or data connection between the first and second connectors by disconnecting one or more electrical paths that include the contact circuits 906 used for transporting power between connectors 100a, 100b.

The foregoing description of aspects and features of the disclosure, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each example disclosed can be combined with any other example. The illustrative examples described above are given to introduce the reader to the general subject matter discussed here and are not intended to limit the scope of the disclosed concepts.

What is claimed is:

1. A communication device comprising:
a processing device configured for communicating data via a data connection; and
a connector communicatively coupled to the processing device, the connector comprising:
at least one terminal configured for forming the data connection with at least one external terminal of a mating connector inserted in the connector, and a sensing module configured for providing a termination signal to the processing device to terminate the data connection in response to detecting a movement associated with removing the mating connector from the connector;
wherein the processing device is configured for terminating data communication via the data connection in response to receiving to the termination signal;
wherein the sensing module comprises:
an additional processing device;
a first conductive contact communicatively coupled to the additional processing device; and
a second conductive contact positioned through a housing of the connector, the second conductive contact movable by the mating connector between a first position in which the first and second conductive contacts are electrically connected and a second position in which the first and second conductive contacts are electrically disconnected;
wherein the additional processing device is configured for providing the termination signal in response to the second conductive contact being moved between the first and second positions;
wherein the second conductive contact is at least partially positioned in a retaining groove defined by the housing and adapted to receive a retaining tab of the mating connector, wherein the second conductive contact is movable to the first position in response to a force exerted by the retaining tab and the additional processing device is configured for providing the termination signal in response to the second conductive contact being in the second position.

2. The communication device of claim 1, wherein the connector further comprises at least one additional terminal configured for forming an electrical connection with at least one additional external terminal of the mating connector;
wherein the processing device is further configured for reducing a current flow via the electrical connection in response to the termination signal.

3. The communication device of claim 1, wherein the sensing module further comprises at least one additional terminal configured for forming at least one of:
an additional data connection with the at least one external terminal of the mating connector, or
an electrical connection with at least one additional external terminal of the mating connector;
wherein the sensing module is configured for providing the termination signal in response to a disconnection of the additional data connection or the electrical connection.

4. The communication device of claim 1, wherein the sensing module further comprises a touch sensor configured to detect an object near the connector, wherein the sensing module is configured for providing the termination signal in response to the touch sensor detecting the object.

5. The communication device of claim 1, wherein the processing device is further configured for responding to the termination signal by performing operations comprising:
identifying a host communication device in communication with the communication device via the data connection; and
notifying the host communication device that the data connection is to be terminated.

6. The communication device of claim 5, wherein the processing device is further configured for responding to the termination signal by performing additional operations comprising:
identifying state data for the communication device; and
transmitting the state data to the host communication device via the data connection.

7. A communication device comprising:
a termination device in a path of an electrical connection;
a connector electrically coupled to the termination device, the connector comprising:
at least one terminal configured for forming the electrical connection with at least one external terminal of a mating connector inserted in the connector;
a sensing module comprising:
a first conductive contact, and
a second conductive contact movable between a first position in which the first and second conductive contacts are electrically connected and a second position in which the first and second conductive contacts are electrically disconnected,
wherein the sensing module is configured for providing a termination signal to the termination device in response to the second conductive contact being moved between the first and second positions; and
a barrier adjacent to an opening defined by a housing of the connector and movable between a closed position at least partially obstructing access to the mating connector and an open position allowing access to the mating connector, wherein the second conductive contact is adjacent to the barrier;
wherein the second conductive contact is movable to the first position in response to a force exerted against the second conductive contact by the barrier in the open position;
wherein the sensing module is configured for providing the termination signal in response to the second conductive contact being in the first position;
wherein the termination device is configured for reducing a current flow via the electrical connection in response to receiving the termination signal.

8. The communication device of claim 7,
wherein the termination device comprises a processing device;
wherein the connector further comprises at least one additional terminal configured for forming a data connection with at least one additional external terminal of the mating connector;
wherein the processing device is configured for terminating data communication via the data connection in response to the termination signal.

9. The communication device of claim 7, wherein the termination device comprises at least one of an electrical switch or a mechanical switch configured for switching from a closed position to an open position in response to the termination signal.

10. The communication device of claim 7, wherein the second conductive contact is at least partially positioned in a retaining groove defined by a housing of the connector and adapted to receive a retaining tab of the mating connector, wherein the second conductive contact is movable to the first position in response to a force exerted by the retaining tab and the sensing module is configured for providing the termination signal in response to the second conductive contact being in the second position.

11. The communication device of claim 7, wherein the second conductive contact is at least partially positioned in the housing to contact a body of the mating connector, wherein the second conductive contact is movable to the first position in response to a force exerted by the body of the mating connector and the sensing module is configured for providing the termination signal in response to the second conductive contact being in the first position.

12. The communication device of claim 7, wherein the second conductive contact is at least partially positioned in the housing to contact a body of the mating connector, wherein the second conductive contact is movable to the first position in response to a force exerted by the body of the mating connector and the sensing module is configured for providing the termination signal in response to the second conductive contact being in the second position.

13. A method comprising:
provided a data connection between a communication device and an additional communication device, the data connection formed by connecting at least one terminal of a connector comprised in the communication device to at least one external terminal of a mating connector of a communication cable;
detecting, by a sensing module, a movement associated with removing the mating connector from the connector, wherein the sensing module comprises a touch sensor configured to detect an object moving near the connector, wherein the movement comprises the object moving near the connector;
providing a termination signal to the communication device to terminate the data connection; and
terminating data communication via the data connection in response to the termination signal.

14. The method of claim 13,
wherein the sensing module further comprises:
a processing device;
a first conductive contact communicatively coupled to the processing device; and
a second conductive contact movable by the mating connector between a first position in which the first and second conductive contacts are electrically connected and a second position in which the first and second conductive contacts are electrically disconnected;
wherein the movement comprises moving the second conductive contact between the first and second positions.

15. The method of claim 13, further comprising performing operations in response to the termination signal, the operations comprising:
identifying a host communication device in communication with the communication device via the data connection; and
notifying the host communication device that the data connection is to be terminated.

16. The method of claim 15, further comprising performing additional operations in response to the termination signal, the additional operations comprising:
identifying state data for the communication device; and
transmitting the state data to the host communication device via the data connection.

* * * * *